United States Patent
Neculau et al.

(10) Patent No.: US 9,248,869 B2
(45) Date of Patent: Feb. 2, 2016

(54) ASSEMBLY FOR A VEHICLE AND A METHOD OF ASSEMBLING THE VEHICLE

(71) Applicant: GM GLOBAL TECHNOLOGY OPERATIONS LLC, Detroit, MI (US)

(72) Inventors: Dragos N. Neculau, Scarborough (CA); Ronald R. Zientak, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 97 days.

(21) Appl. No.: 14/051,609

(22) Filed: Oct. 11, 2013

(65) Prior Publication Data

US 2015/0102638 A1 Apr. 16, 2015

(51) Int. Cl.
| | |
|---|---|
| *B62D 27/06* | (2006.01) |
| *B62D 65/06* | (2006.01) |
| *B62D 25/08* | (2006.01) |
| *B62D 25/16* | (2006.01) |

(52) U.S. Cl.
CPC .............. *B62D 27/06* (2013.01); *B62D 25/082* (2013.01); *B62D 25/163* (2013.01); *B62D 65/06* (2013.01)

(58) Field of Classification Search
CPC ......... B62D 65/02; B62D 27/06; B62D 65/06

USPC ................ 296/191, 193.06; 28/428
See application file for complete search history.

(56) References Cited

U.S. PATENT DOCUMENTS

| | | | | |
|---|---|---|---|---|
| 8,414,067 | B2 * | 4/2013 | Howard et al. | 296/193.04 |
| 2011/0133514 | A1 * | 6/2011 | Erb | B62D 35/02 296/191 |
| 2012/0133160 | A1 * | 5/2012 | Reichenbach | B60R 19/12 293/120 |
| 2012/0187722 | A1 * | 7/2012 | Dawe | F16B 5/0664 296/191 |
| 2013/0093212 | A1 * | 4/2013 | Harris | B60Q 1/2626 296/191 |

* cited by examiner

*Primary Examiner* — Pinel Romain
(74) *Attorney, Agent, or Firm* — Quinn Law Group, PLLC

(57) ABSTRACT

An assembly for a vehicle and a method of assembling the vehicle are disclosed. The assembly includes a first panel and a second panel. The first panel includes a first edge and the second panel includes a second edge generally aligning with the first edge of the first panel. The assembly also includes a bracket attached to one of the first and second panels. The assembly further includes a coupler engaging the bracket. The coupler includes a proximal end portion and a distal end portion. The distal end portion is movable with respect to one of the first and second panels as the proximal end portion is secured to the other one of the first and second panels such that one of the first and second edges moves toward the other one of the first and second edges.

20 Claims, 5 Drawing Sheets

ASSEMBLY FOR A VEHICLE AND A METHOD OF ASSEMBLING THE VEHICLE

TECHNICAL FIELD

The present disclosure relates to an assembly for a vehicle and a method of assembling the vehicle.

BACKGROUND

Various exterior parts of a vehicle are fastened together. For example, many vehicles include a fascia and one or more fenders. The fascia and the fender are secured to each other to bring together edges of the fascia and the fender that are visible from the outside of the vehicle. The fascia and the fender are secured to each other from inside the engine compartment area which makes assembly of the distal end of the fascia and the distal end of the fender challenging because that location is not readily accessible by fasteners.

SUMMARY

The present disclosure provides an assembly for a vehicle. The assembly includes a first panel and a second panel. The first panel includes a first edge and the second panel includes a second edge generally aligning with the first edge of the first panel. The assembly also includes a bracket attached to one of the first and second panels. The assembly further includes a coupler engaging the bracket. The coupler includes a proximal end portion and a distal end portion. The distal end portion is movable with respect to one of the first and second panels as the proximal end portion is secured to the other one of the first and second panels such that one of the first and second edges moves toward the other one of the first and second edges.

The present disclosure also provides a method of assembling a vehicle. A bracket is attached to one of a first panel and a second panel to define a unit. The unit is coupled to the other one of the first and second panels. A coupler engages the bracket, and a proximal end portion of the coupler is secured to one of the first and second panels. A distal end portion of the coupler moves with respect to one of the first and second panels as the proximal end portion is secured to the other one of the first and second panels such that one of a first edge of the first panel and a second edge of the second panel move toward the other one of the first and second edges.

Therefore, the first and second edges of the first and second panels can be brought together without having to access the distal end portion of the coupler which simplifies assembly of the vehicle, and thus, reduces assembly time.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
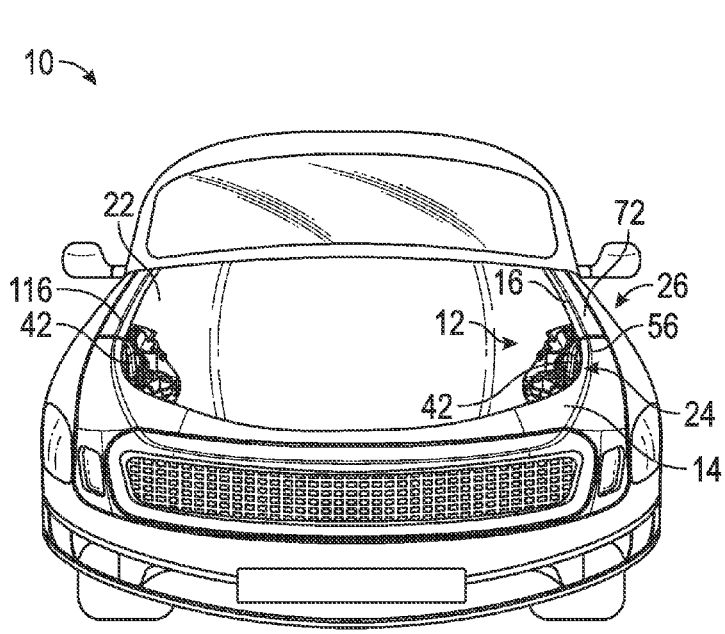
FIG. 1 is a schematic perspective view of a vehicle, with a portion of a hood cut away to illustrate an assembly for the vehicle.
Figure 2:
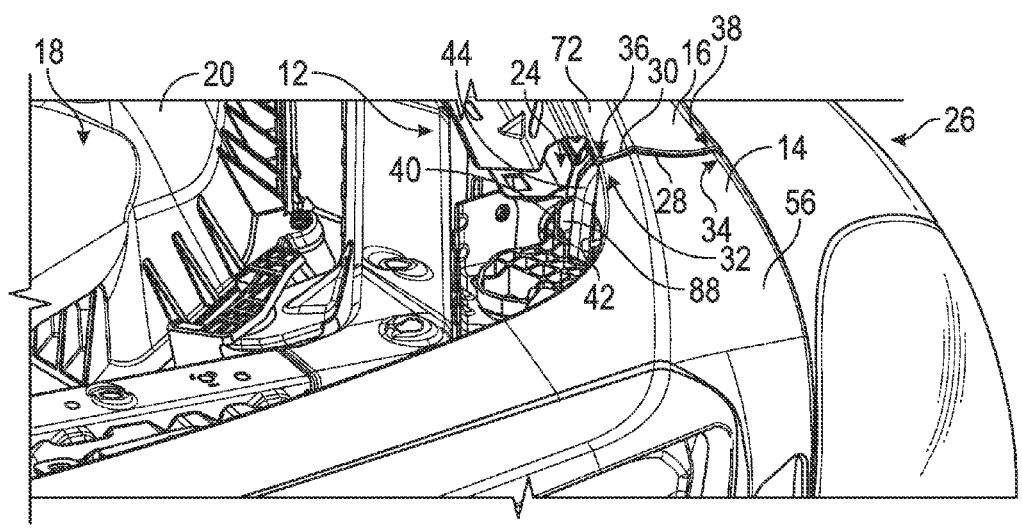
FIG. 2 is an enlarged schematic fragmentary perspective view of the vehicle illustrating the assembly of FIG. 1, with a proximal end portion of a coupler accessible from an inboard region of an engine compartment.

Referring to the Figures, wherein like numerals indicate like or corresponding parts throughout the several views, a vehicle 10 is generally shown in FIG. 1 and an assembly 12 for the vehicle 10 is generally shown in FIG. 2. The vehicle 10 can be an automotive vehicle 10, such as, a car, a truck, etc. It is to be appreciated that the vehicle 10 can alternatively be a non-automotive vehicle 10, such as, farm, marine or aviation vehicles 10, etc.

Figure 3:
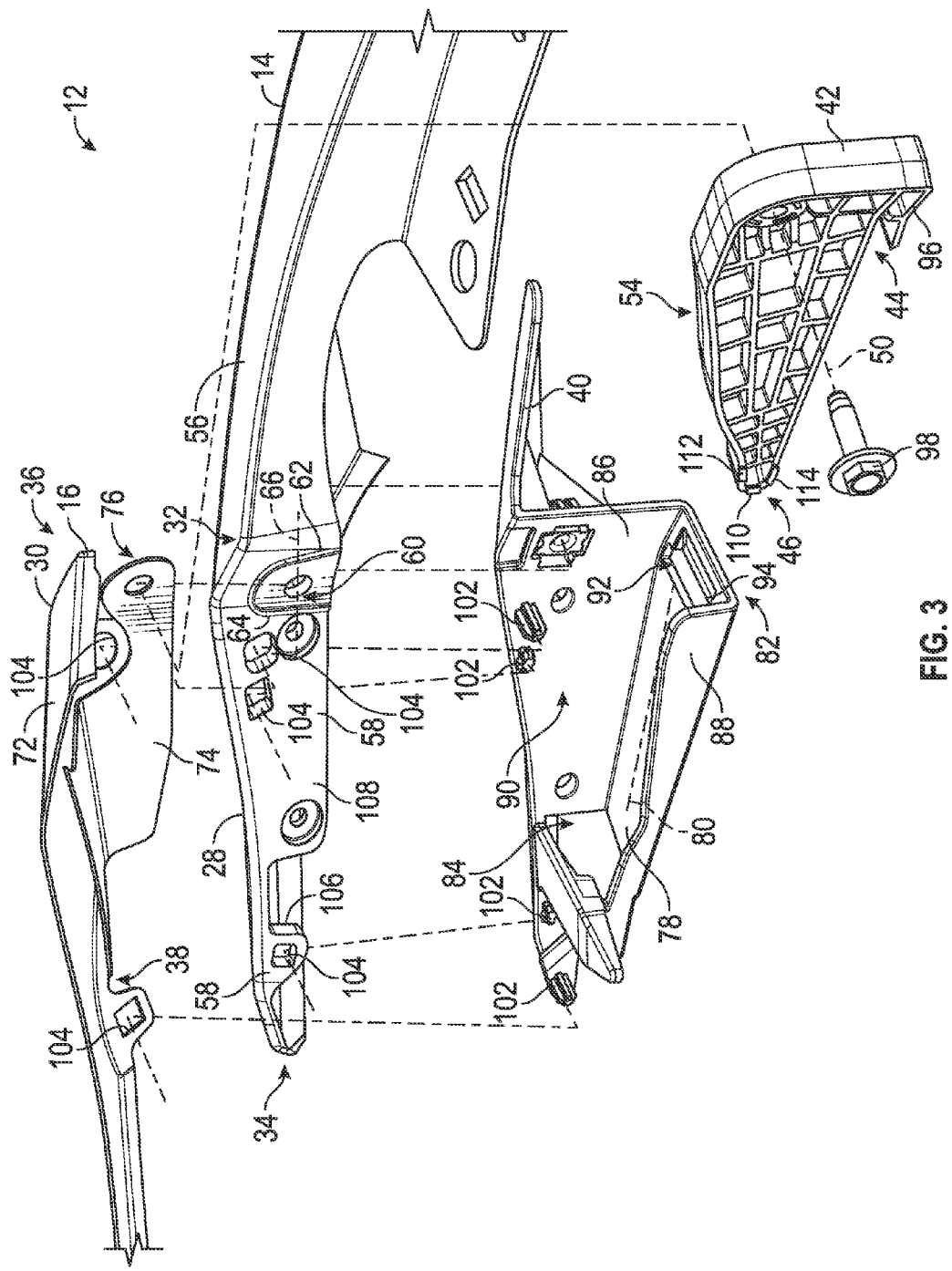
FIG. 3 is a schematic fragmentary exploded perspective view of the assembly of FIGS. 1 and 2.

Referring to FIGS. 2 and 3, the assembly 12 includes a first panel 14 and a second panel 16. Generally, the first and second panels 14, 16 are disposed adjacent to each other. For example, the first panel 14 can be a fascia panel and the second panel 16 can be a fender panel. It is to be appreciated that the first and second panels 14, 16 can be any suitable configuration and disposed at any suitable location, and the fascia and fender panels are only examples.

The first and second panels 14, 16 can be coupled to each other such that these panels 14, 16 cooperate to define an engine compartment 18 therebetween. The engine compartment 18 can house an engine 20, a transmission, a radiator, etc. A hood 22 (see FIG. 1) can be movable relative to the first and second panels 14, 16 to open and close the engine compartment 18. Generally, the engine compartment 18 is readily accessible from an inboard region 24, while an outboard region 26 of the engine compartment 18 is covered by the first and second panels 14, 16, and thus, the outboard region 26 is not readily accessible. For example, during assembly of the vehicle 10, a worker will couple the first and second panels 14, 16 together from the inboard region 24 without having to access the outboard region 26, which simplifies assembly of the vehicle 10. Therefore, assembly of the first and second panels 14, 16 is easier, as well as faster, as further discussed below.

Continuing with FIGS. 2 and 3, the first panel 14 includes a first edge 28 and the second panel 16 includes a second edge 30 generally aligning with the first edge 28 of the first panel 14. The edges 28, 30 of the first and second panels 14, 16 cooperate with each other, and specifically, the first and second edges 28, 30 are brought together to minimize any gap therebetween. Therefore, the first and second edges 28, 30 each have configurations cooperating with each other.

Furthermore, as best shown in FIG. 2, the first panel 14 can include a proximal end 32 and a distal end 34 along the first edge 28. Furthermore, the second panel 16 can include a proximal end 36 and a distal end 38 along the second edge 30. The proximal ends 32, 36 of the first and second panels 14, 16 are disposed adjacent to each other. Similarly, the distal ends 34, 38 of the first and second panels 14, 16 are disposed adjacent to each other. Generally, the proximal ends 32, 36 of the first and second panels 14, 16 are disposed adjacent to the inboard region 24 of the engine compartment 18 while the distal ends 34, 38 of the first and second panels 14, 16 are disposed adjacent to the outboard region 26 of the engine compartment 18.

Referring to FIG. 3, the assembly 12 further includes a bracket 40 attached to one of the first and second panels 14, 16. Generally, the bracket 40 is attached to one of the first and second panels 14, 16 such that one of the first and second panels 14, 16 supports the bracket 40. In one embodiment, the bracket 40 is attached to the first panel 14. In another embodiment, the bracket 40 is attached to the second panel 16. The bracket 40 is attached to one of the first and second panels 14, 16 to define a unit. Therefore, when the bracket 40 is attached to the first panel 14 to define the unit, the unit is then secured to the second panel 16. Alternatively, when the bracket 40 is attached to the second panel 16 to define the unit, the unit is then secured to the first panel 14.

Continuing with FIG. 3, the assembly 12 also includes a coupler 42 engaging the bracket 40. The coupler 42 includes a proximal end portion 44 and a distal end portion 46. Generally, the proximal end portion 44 of the coupler 42 is exposed adjacent to the proximal ends 32, 36 of the first and second panels 14, 16, and the distal end portion 46 of the coupler 42 is hidden adjacent to the distal ends 34, 38 of the first and second panels 14, 16. In other words, the first and second panels 14, 16 cover the distal end portion 46 of the coupler 42 such that the distal end portion 46 is not readily accessible.

Figure 4:
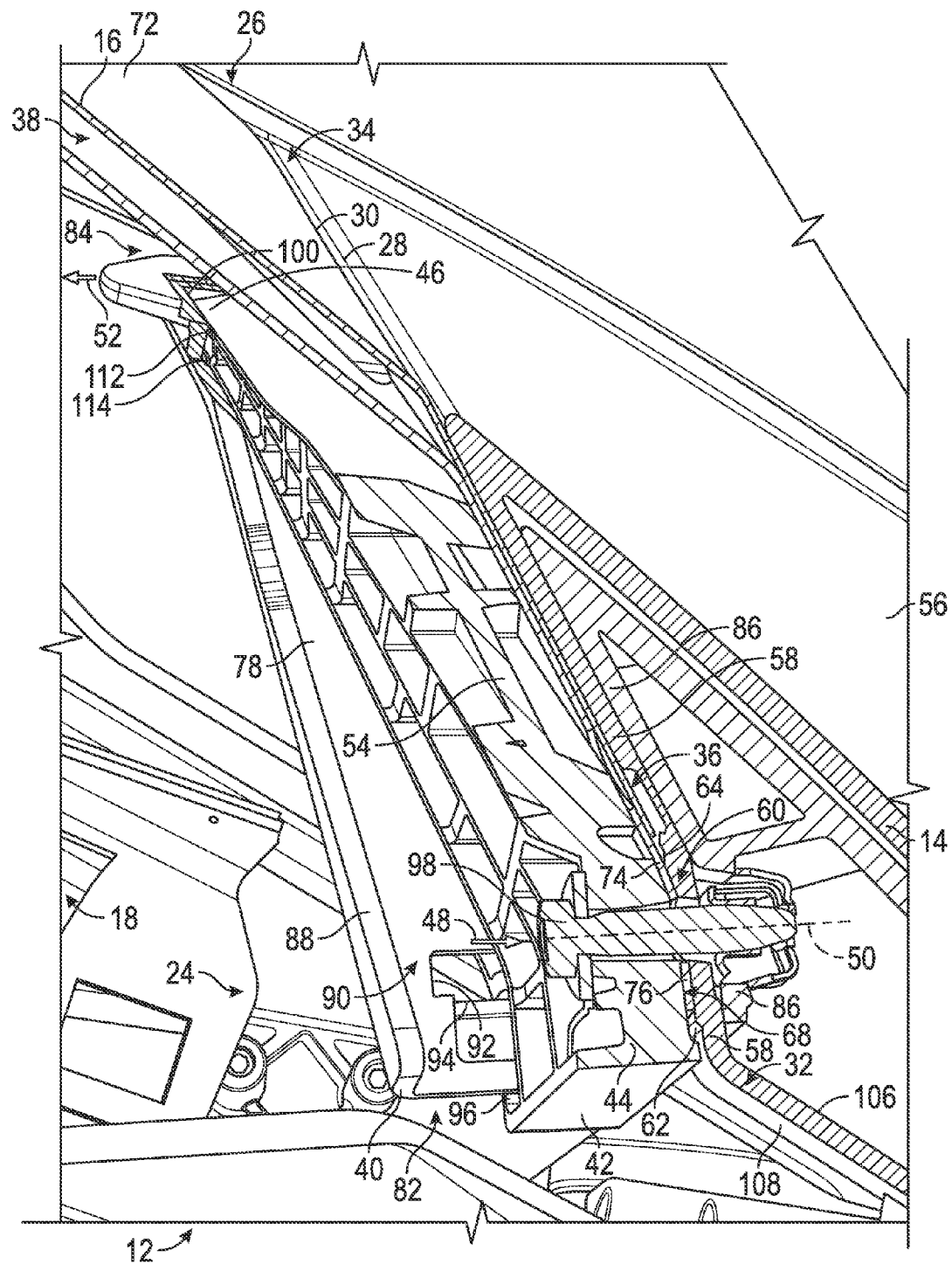
FIG. 4 is a schematic fragmentary cross-sectional view of the assembly of FIGS. 1-3, with the coupler disposed in a channel of a bracket, and with a portion of the bracket cut away to illustrate a plurality of feet of the coupler engaging an engagement surface of the bracket.

The distal end portion 46 is movable with respect to one of the first and second panels 14, 16 as the proximal end portion 44 is secured to the other one of the first and second panels 14, 16 such that one of the first and second edges 28, 30 moves toward the other one of the first and second edges 28, 30. For example, in one embodiment, as shown in FIG. 4, the proximal end portion 44 of the coupler 42 is secured to the first panel 14 such that the distal end portion 46 is movable away from the first panel 14 to move the first edge 28 toward the second edge 30. For example, as the distal end portion 46 of the coupler 42 moves away from the first panel 14, the first edge 28 of the first panel 14 is pulled toward the second edge 30 of the second panel 16. Specifically, the first edge 28 along the distal end 34 of the first panel 14 is pulled toward the second edge 30 along the distal end 38 of the second panel 16 when the distal end portion 46 of the coupler 42 moves away from the first panel 14.

Therefore, as shown in FIG. 4, the proximal end portion 44 moves in a first direction 48 (see arrow 48) toward the first panel 14 along a central axis 50 which causes the distal end portion 46 to move in an opposite direction 52 (see arrow 52) away from the first panel 14. Specifically, as the distal end portion 46 of the coupler 42 moves in the opposite direction 52 away from the first panel 14, the first edge 28 along the distal end 34 of the first panel 14 is pulled toward the second edge 30 along the distal end 38 of the second panel 16, thus no fastener is needed through the distal ends 34, 38 of the first and second panels 14, 16. In the embodiment with the proximal end portion 44 secured to the first panel 14, the bracket 40 is attached to the first panel 14. As another example, in another embodiment, the proximal end portion 44 of the coupler 42 is secured to the second panel 16 such that the distal end portion 46 is movable away from the second panel 16 to move the second edge 30 toward the first edge 28. In the embodiment with the proximal end portion 44 secured to the second panel 16, the bracket 40 is attached to the second panel 16. Generally, the coupler 42 acts as a cantilever, with the proximal end portion 44 secured to one of the first and second panels 14, 16 and the distal end portion 46 free to move toward the other one of the first and second panels 14, 16. Therefore, the distal end portion 46 is not secured to one of the first and second panels 14, 16 with a fastener, etc., which simplifies assembly of the first and second panels 14, 16 by not having to reach into the outboard region 26 where the distal ends 34, 38 of the first and second panels 14, 16 are located.

As shown in FIG. 4, in certain embodiments, the coupler 42 can include a middle portion 54 disposed between the proximal end portion 44 and the distal end portion 46. Generally, the middle portion 54 angles away from the first panel 14 from the proximal end portion 44 to the distal end portion 46. Furthermore, in certain embodiments, the distal end portion 46 can be angled with the middle portion 54 as shown in FIG. 4. The distal end portion 46 can extend from one end of the middle portion 54, and in certain embodiments, the proximal and distal end portions 44, 46 and the middle portion 54 are formed of one piece or integrally formed to each other. The proximal and distal end portions 44, 46, as well as the middle portion 54, can be any suitable orientation depending on whether the proximal end portion 44 is attached to the first panel 14 or the second panel 16. Furthermore, the proximal and distal end portions 44, 46, as well as the middle portion 54, can be any suitable orientation to apply the desired amount of pressure or force to move one of the edges 28, 30 at the distal end 34, 38 toward the other one of the edges 28, 30 at the distal end 34, 38. It is to be appreciated that the proximal and distal end portions 44, 46 and the middle portion 54 can be attached to each other instead of being integrally formed to each other.

Turning to FIGS. 2 and 3, the first panel 14 can include a top surface 56 facing away from the bracket 40. The top surface 56 of the first panel 14 faces outwardly from the vehicle 10, and therefore, the top surface 56 of the first panel 14 is visible from outside of the vehicle 10. Generally, the first edge 28 is disposed adjacent to the top surface 56 of the first panel 14. The first panel 14 can include a first flange 58 extending from the first edge 28 away from the top surface 56 of the first panel 14. The first flange 58 can be sandwiched between the coupler 42 and the bracket 40. It is to be appreciated that the first flange 58 can be attached to the first panel 14 or integrally formed to the first panel 14, i.e., formed as one piece.

Figure 5:
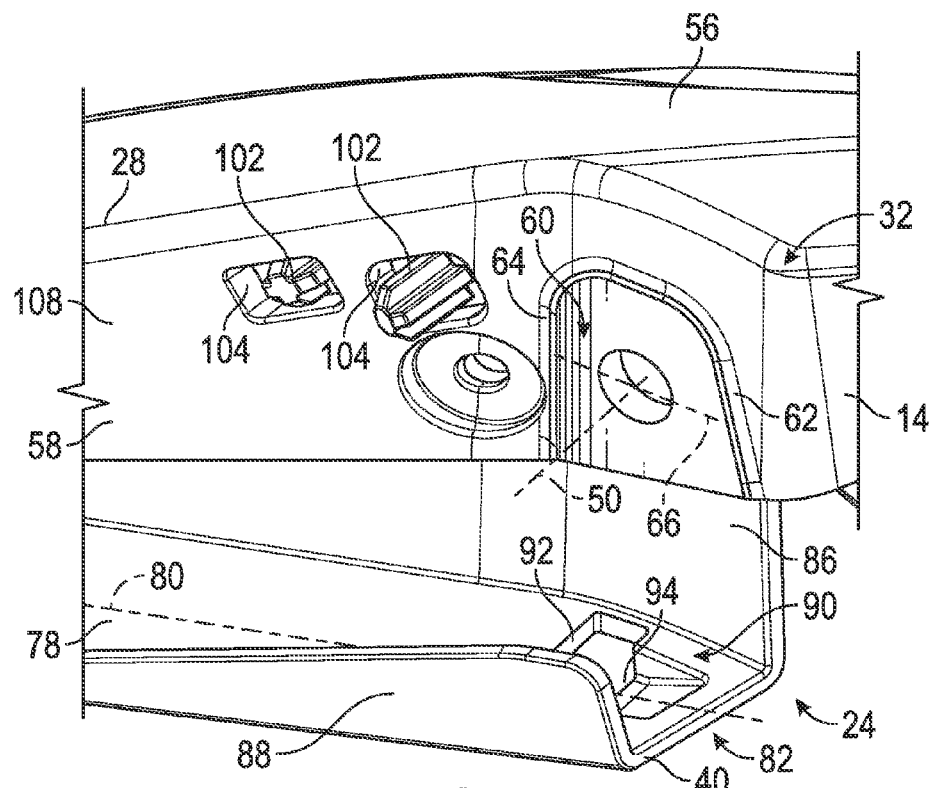
FIG. 5 is a schematic fragmentary perspective view of the bracket attached to the first panel, with an engagement surface of a first flange facing the channel.

Referring to FIGS. 3 and 5, the first flange 58 can include a first engagement surface 60. Generally, the first engagement surface 60 can present a first perimeter end 62 and a second perimeter end 64 spaced from each other relative to a first axis 66. In certain embodiments, the first engagement surface 60 is contoured from the first perimeter end 62 toward the second perimeter end 64. For example, the first engagement surface 60 can be arcuate or curved such that the second perimeter end 64 contours outwardly away from the first flange 58. The first axis 66 is transverse to the central axis 50, and in certain embodiments, the first axis 66 is perpendicular to the central axis 50.

Figure 6:
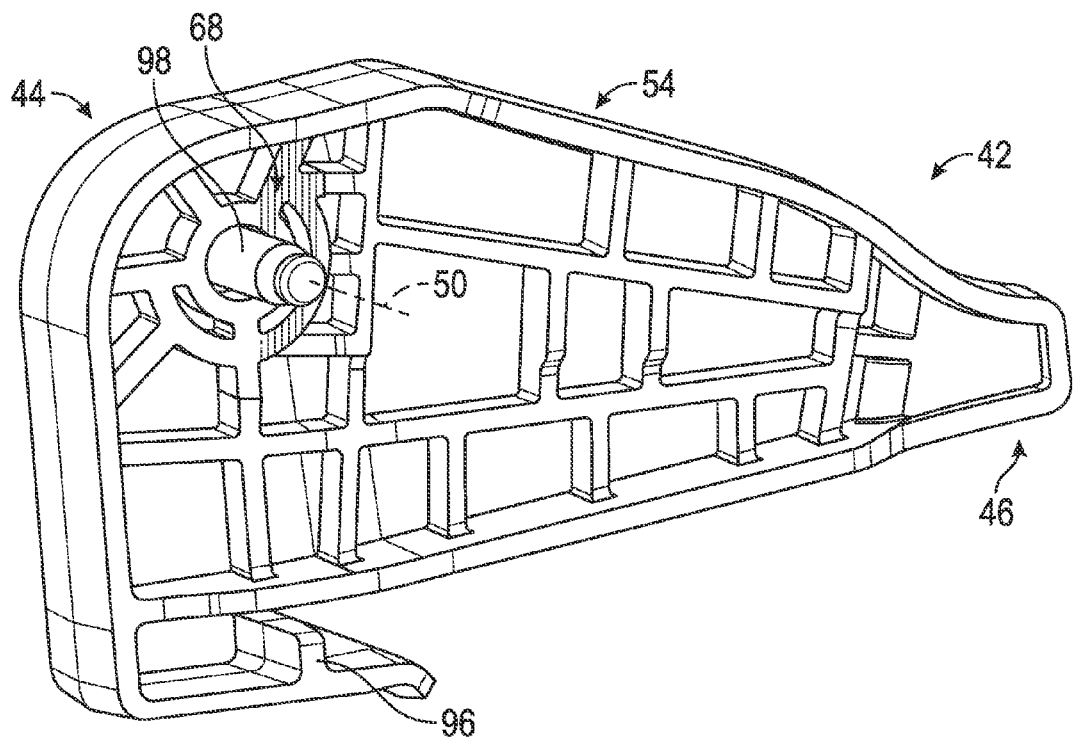
FIG. 6 is a schematic perspective view of the coupler including an engagement surface.

Referring to FIG. 6, the proximal end portion 44 of the coupler 42 can include a second engagement surface 68 facing the first engagement surface 60 (see FIG. 5 for the first engagement surface 60). The first and second engagement surfaces 60, 68 are complementary in configuration to each other. More specifically, the second engagement surface 68 is contoured complementary to the contour of the first engagement surface 60 such that the first and second engagement surfaces 60, 68 are complementary in configuration to each other.

Figure 7:
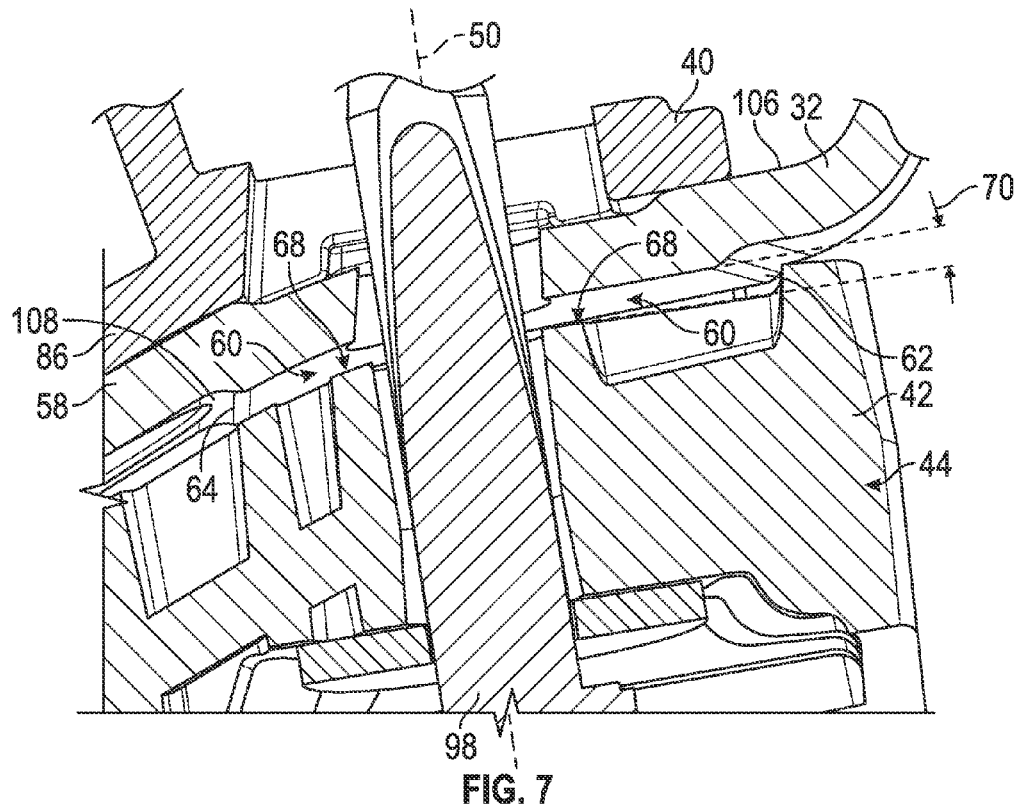
FIG. 7 is a schematic fragmentary cross-sectional view of the bracket, the first panel and the coupler, with the second engagement surface disposed at an angle relative to the first engagement surface, and with a second flange of the second panel removed from between the first and second engagement surfaces for illustrative purposes only.
Figure 8:
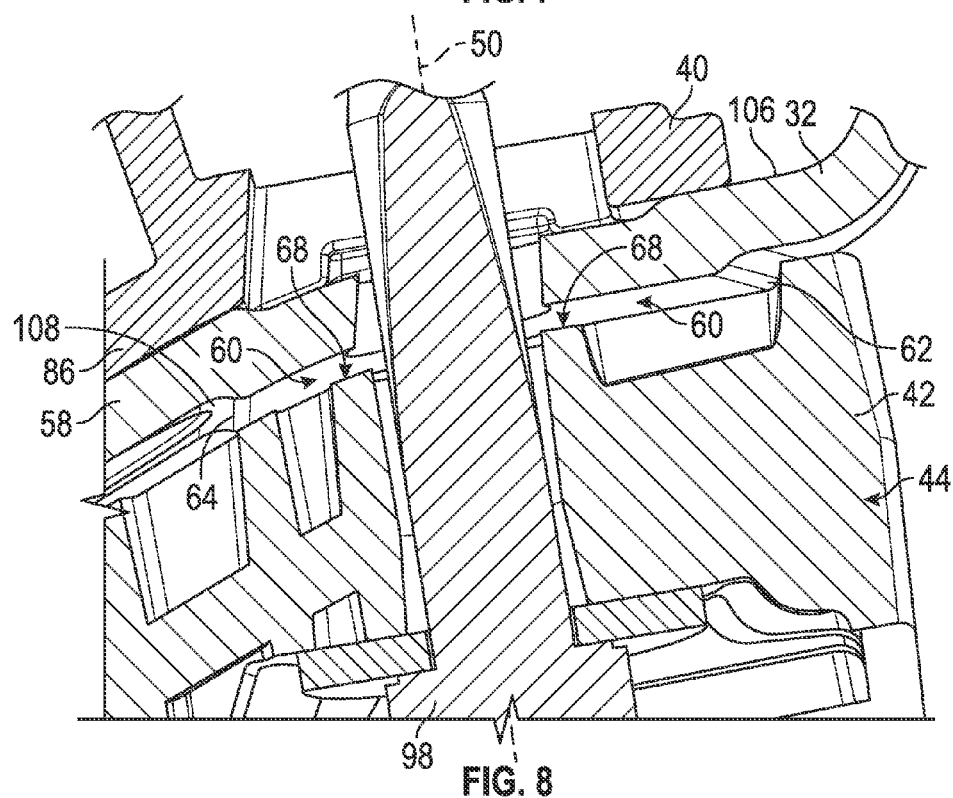
FIG. 8 is a schematic fragmentary cross-sectional view of the bracket, the first panel and the coupler, with the first and second engagement surfaces offset from each other (i.e., the angle is removed) and with the second flange of the second panel removed from between the first and second engagement surfaces for illustrative purposes only.

Generally, the second engagement surface 68 is disposed at an angle 70 (see FIG. 7) relative to the first engagement surface 60 prior to the coupler 42 being secured to the first panel 14. The angle 70 is exaggerated in FIG. 7 for illustrative purposes only. The second engagement surface 68 moves relative to the first engagement surface 60 as the coupler is being secured to the first panel 14 to reduce the angle 70 until the second engagement surface 68 is offset from the first engagement surface 60 (see FIGS. 4 and 8 for the offset). The distal end portion 46 of the coupler 42 correspondingly moves as the second engagement surface 68 moves to reduce the angle 70 between the first and second engagement surfaces 60, 68. When the coupler 42 is secured to the first panel 14, the angle 70 is removed (see FIGS. 4 and 8) such that the first and second engagement surfaces 60, 68 are offset from each other. For example, the first and second engagement surfaces 60, 68 can be offset in a substantially parallel relationship. As the angle 70 is being removed, the proximal end portion 44 of the coupler 42 moves toward the first engagement surface 60 and thus the coupler 42 sandwiches the first flange 58 between the second engagement surface 68 and the bracket 40 such that the first edge 28 along the proximal end 32 of the first panel 14 moves toward the second edge 30 along the proximal end 36 of the second panel 16. Furthermore, as the angle 70 is being removed, the distal end portion 46 of the coupler 42 correspondingly moves; for example, the distal end portion 46 can move the amount of the angle 70 in the opposite direction 52 that the proximal end portion 44 is moving in the first direction 48. Therefore, the larger the angle 70, the greater the amount of movement of the distal end portion 46. Similarly, the smaller the angle 70, the smaller the amount of movement of the distal end portion 46. In certain embodiments, for example, the angle 70 can be greater than 0° (degrees) to about 5°. Depending on the orientation of the coupler 42 and/or the angle 70, the amount of pressure or force to move one of the first and second edges 28, 30 at the distal ends 34, 38 of the first and second panels 14, 16 can correspondingly be changed as discussed further below.

Turning back to FIGS. 2 and 3, the second panel 16 can include a top surface 72 facing away from the bracket 40. The top surface 72 of the second panel 16 faces outwardly from the vehicle 10, and therefore, the top surface 72 of the second panel 16 is visible from outside of the vehicle 10. Generally, the second edge 30 is disposed adjacent to the top surface 72 of the second panel 16. The second panel 16 can include a second flange 74 extending outwardly away from the top surface 72 of the second panel 16 toward the proximal end 36 of the second panel 16. The second flange 74 can be sandwiched between the first and second engagement surfaces 60, 68. Therefore, an end portion 76 of the second flange 74 is contoured complementary to the first and second engagement surfaces 60, 68 such that the end portion 76 is sandwiched therebetween in a complementary manner. Having the second flange 74 disposed between the first and second engagement surfaces 60, 68 causes the first and second engagement surfaces 60, 68 to be offset from each other when the angle 70 is removed when the coupler 42 is secured to one of the first and second panels 14, 16. In other words, the first and second engagement surfaces 60, 68 are substantially parallel to each other when the angle 70 is removed due to the second flange 74 being disposed therebetween. Simply stated, the first and second engagement surfaces 60, 68 are separated by the second flange 74. It is to be appreciated that the second flange 74 can be attached to the second panel 16 or integrally formed to the second panel 16, i.e., formed as one piece.

Referring to FIG. 3, the bracket 40 can include a base 78 extending along a longitudinal axis 80 between a first end 82 and a second end 84. Therefore, the base 78 is elongated along the longitudinal axis 80 between the first and second ends 82, 84. Generally, the longitudinal axis 80 is spaced from the central axis 50 (also see FIG. 4) and disposed transverse relative to the central axis 50. Furthermore, the longitudinal axis 80 is spaced from the first axis 66.

Furthermore, the bracket 40 can include a first side wall 86 and a second side wall 88 each extending from the base 78 in a spaced relationship transverse to the longitudinal axis 80 to define a channel 90 therebetween. For example, the second side wall 88 extends upwardly toward the central axis 50 and the first side wall 86 extends upwardly toward and beyond the central axis 50. The coupler 42 is disposed in the channel 90. As such, the bracket 40 supports the coupler 42 before the coupler 42 is secured to one of the first and second panels 14, 16. Prior to securing the coupler 42 to one of the first and second panels 14, 16, the coupler 42 is supported by the bracket 40. Therefore, during assembly 12, the coupler 42 can be inserted into the channel 90 and supported by the bracket 40 while the worker prepares to secure the coupler 42 to one of the first and second panels 14, 16. Furthermore, before the coupler 42 is secured to one of the first and second panels 14, 16, the angle 70 (see FIG. 7) assists in inserting the coupler 42 in the channel 90 such that the distal end portion 46 of the coupler 42 easily moves into the desired position.

Continuing with FIG. 3, the base 78 can define an aperture 92 adjacent to the first end 82 to present a lip 94. Additionally, the coupler 42 can include a tab 96 disposed in the aperture 92 and engaging the lip 94 to couple the coupler 42 to the bracket 40. Specifically, the tab 96 loosely couples the coupler 42 to the bracket 40 such that the coupler 42 can still move in the channel 90 when being secured to one of the first and second panels 14, 16. In one embodiment, the tab 96 is disposed along the proximal end portion 44 of the coupler 42, with the tab 96 spaced from the second engagement surface 68. The tab 96 extends generally toward the middle portion 54 of the coupler 42 such that a portion of the base 78 is disposed in the tab 96. Therefore, during assembly 12, the coupler 42 can be inserted into the channel 90 such that the tab 96 biases or flexes over a portion of the base 78 and into the aperture 92 to engage the lip 94, and thus, couple the coupler 42 to the bracket 40 while the worker prepares to secure the coupler 42 to one of the first and second panels 14, 16.

Turning to FIGS. 3 and 4, the assembly 12 can also include a fastener 98 disposed through the proximal end portion 44 of the coupler 42, the first panel 14 and the bracket 40 to secure the coupler 42 to the first panel 14. More specifically, the fastener 98 can be disposed through the second flange 74 of the second panel 16, the first and second engagement surfaces 60, 68 and the first side wall 86 of the bracket 40 to secure the coupler 42 to the first panel 14. Generally, the first side wall 86 of the bracket 40 is disposed behind the first flange 58 such that the first flange 58 covers a portion of the first side wall 86 relative to the channel 90. Furthermore, in certain embodiments, the second flange 74 of the second panel 16 can be disposed between the coupler 42 and the first flange 58 of the second panel 16. Therefore, in certain embodiments, the first and second flanges 58, 74 can be sandwiched between the proximal end portion 44 of the coupler 42 and the first side wall 86 of the bracket 40 (see FIG. 4). The fastener 98 can be any suitable configuration/design to secure the coupler 42 to one of the first and second panels 14, 16, and non-limiting examples can include a bolt and push nut design, a pin/screw and nut design, a clip, a barbed pin, or any combinations thereof.

Continuing with FIG. 4, the second side wall 88 can include a third engagement surface 100 disposed adjacent to the second end 84 of the base 78. The distal end portion 46 of the coupler 42 is movable to engage the third engagement surface 100 to move the first edge 28 toward the second edge 30 as the proximal end portion 44 of the coupler 42 is secured to the first panel 14. For example, when the distal end portion 46 moves toward and engages the third engagement surface 100, the distal end 34 of the first panel 14, along the first edge 28, moves toward the distal end 38 of the second panel 16 along the second edge 30. Specifically, the distal end portion 46 engages the third engagement surface 100 to apply the force or pressure to the third engagement surface 100 which moves the second end 84 of the bracket 40 and correspondingly moves the distal end 34 of the first panel 14 toward the distal end 38 of the second panel 16, due to the way the bracket 40 is coupled to the first panel 14 as discussed below. It is to be appreciated that the second side wall 88 can be eliminated and the third engagement surface 100 can extend from a portion of the second end 84 of the base 78. Depending on the orientation and/or configuration of the third engagement surface 100, the amount of pressure or force to move one of the first and second edges 28, 30 at the distal ends 34, 38 of the first and second panels 14, 16 can correspondingly be changed.

As best shown in FIG. 3, one or more pins 102 can extend from the bracket 40. In certain embodiments, the pins 102 extend outwardly from the first side wall 86. One or more pins 102 can be disposed through respective openings 104 defined in the first and second panels 14, 16. More specifically, one or more openings 104 can be defined in the first flange 58. For example, when the bracket 40 is attached to the first panel 14, the pins 102 are disposed through respective openings 104 such that the pins 102 extend from a back side 106 of the first flange 58 outwardly through a front side 108 of the first flange 58. Therefore, the first side wall 86 of the bracket 40 is disposed along the back side 106 of the first flange 58. In other words, the first side wall 86 is disposed behind the first flange 58 such that when the distal end portion 46 engages the third engagement surface 100, the first side wall 86 abuts or engages the first flange 58 along the distal end 34 of the first edge 28 which causes movement of the first flange 58. One or more of the other pins 102 can extend through respective openings 104 of the second panel 16 to align the unit thereto.

In certain embodiments, as best shown in FIGS. 3 and 4, optionally, the distal end portion 46 of the coupler 42 can include a foot 110 facing the third engagement surface 100. The foot 110 engages the third engagement surface 100 as the proximal end portion 44 of the coupler 42 is secured to the first panel 14 to move the first edge 28 toward the second edge 30.

The foot 110 can be further defined as a first foot 110. Therefore, in certain embodiments, optionally, the distal end portion 46 of the coupler 42 can include a second foot 112 spaced from the first foot 110 and engaging the third engagement surface 100 when the coupler 42 is secured to the first panel 14 to move the first edge 28 toward the second edge 30. Furthermore, in certain embodiments, optionally, the distal end portion 46 of the coupler 42 can include a third foot 114 spaced from the first and second feet 110, 112. The third foot 114 can engage the third engagement surface 100 when the coupler 42 is secured to the first panel 14 to move the first edge 28 toward the second edge 30. It is to be appreciated any suitable number of feet 110, 112, 114 can be utilized. In other words, one or more feet 110, 112, 114 can be utilized and disposed at any suitable location to engage the third engagement surface 100. Depending on the orientation and/or configuration of one or more of the feet 110, 112, 114, the amount of pressure or force to move one of the first and second edges 28, 30 at the distal ends 34, 38 of the first and second panels 14, 16 can correspondingly be changed.

Furthermore, in certain embodiments, the coupler 42 can be further defined as a plurality of couplers 42, with one coupler 42 disposed along one side of the vehicle 10 and another coupler 42 disposed along the opposite side of the vehicle 10 (see FIG. 1). Therefore, the assembly 12 can include a third panel 116, with the first and third panels 14, 116 disposed adjacent to each other. For example, the second panel 16 can be a first fender panel and the third panel 116 can be a second fender panel disposed on the opposite side of the vehicle 10. Therefore, the first panel 14 (the fascia panel) can be coupled to the second and third panels 16, 116 (the first and second fender panels) such that these panels 14, 16, 116 (the panels) cooperate to further define the engine compartment 18 therebetween. Again, the hood 22 can be movable between the second and third panels 16, 116 to open and close the engine compartment 18. The outboard region 26 of the engine compartment 18 can be covered by the first and third panels 14, 116, thus making the outboard region 26 not readily accessible. It is to be appreciated that the third panel 116 can be any suitable configuration and disposed at any suitable location, and the second fender panel is only an example.

The first panel 14 along the opposite side can have a similar configuration as discussed above for the first flange 58, etc. (but can be mirrored for the opposite side of the vehicle 10), and therefore will not be re-discussed. Furthermore, the third panel 116 can have a similar configuration as discussed above for the second panel 16 (but can be mirrored for the opposite side of the vehicle 10), and therefore will not be re-discussed. Additionally, the other coupler 42 can have a similar configuration as discussed above but can be mirrored for the opposite side of the vehicle 10, and therefore will not be re-discussed. In addition, the bracket 40 can be further defined as a plurality of brackets 40, with one bracket 40 disposed along one side of the vehicle and another bracket disposed along the opposite side of the vehicle, and furthermore, this other bracket 40 can have a similar configuration as discussed above but can be mirrored for the opposite side of the vehicle 10. It is to be appreciated that various other features discussed herein can be mirrored for the opposite side of the vehicle 10.

Figure 9:
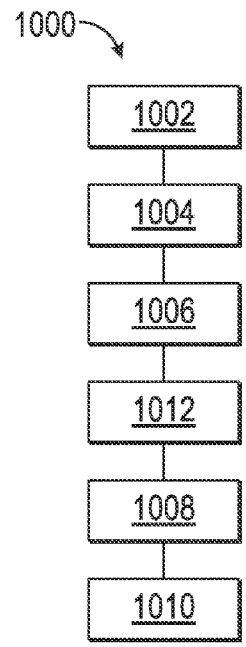
FIG. 9 is a schematic flow chart of a method of assembling the vehicle.

Referring to FIG. 9, the present disclosure also provides a method 1000 of assembling the vehicle 10. The method 1000 includes attaching 1002 the bracket 40 to one of the first panel 14 and the second panel 16 to define the unit and coupling 1004 the unit to the other one of the first and second panels 14, 16. Therefore, attaching 1002 the bracket 40 to one of the first and second panels 14, 16 occurs before coupling 1004 the unit to the other one of the first and second panels 14, 16. In certain embodiments, attaching 1002 the bracket 40 to one of the first and second panels 14, 16 can include attaching the bracket 40 to the first panel 14 to define the unit, and coupling 1004 the unit to the other one of the first and second panels 14, 16 can include coupling the unit to the second panel 16. In this embodiment, attaching the bracket 40 to the first panel 14 occurs before coupling the unit to the second panel 16. In other embodiments, attaching 1002 the bracket 40 to one of the first and second panels 14, 16 can include attaching the bracket 40 to the second panel 16 to define the unit, and coupling 1004 the unit to the other one of the first and second panels 14, 16 can include coupling the unit to the first panel 14. In this embodiment, attaching the bracket 40 to the second panel 16 occurs before coupling the unit to the first panel 14.

The method 1000 also includes engaging 1006 the coupler 42 with the bracket 40. Engaging 1006 the coupler 42 with the bracket 40 occurs after coupling 1004 the unit to the other one of the first and second panels 14, 16. More specifically, engaging 1006 the coupler 42 with the bracket 40 can include disposing the tab 96 of the coupler 42 in the aperture 92 of the base 78 of the bracket 40 such that the tab 96 engages the lip 94 to couple the coupler 42 to the bracket 40. Generally, in one embodiment, engaging 1006 the coupler 42 with the bracket 40 occurs after coupling the unit to the second panel 16.

The method 1000 further includes securing 1008 the proximal end portion 44 of the coupler 42 to one of the first and second panels 14, 16. For example, in one embodiment, securing 1008 the proximal end portion 44 of the coupler 42 to one of the first and second panels 14, 16 can include securing the proximal end portion 44 of the coupler 42 to the first panel 14. As another example, in another embodiment, securing 1008 the proximal end portion 44 of the coupler 42 to one of the first and second panels 14, 16 can include securing the proximal end portion 44 of the coupler 42 to the second panel 16. Furthermore, engaging 1006 the coupler with the bracket 40 includes positioning the second engagement surface 68 of the coupler 42 at the angle 70 relative to the first engagement surface 60 of the first panel 14 before securing 1008 the proximal end portion 44 of the coupler 42 to the first panel 14.

Additionally, the method 1000 includes moving 1010 the distal end portion 46 of the coupler 42 with respect to one of the first and second panels 14, 16 as the proximal end portion 44 is secured to the other one of the first and second panels 14, 16 such that one of the first edge 28 of the first panel 14 and the second edge 30 of the second panel 16 move toward the other one of the first and second edges 28, 30. Simply stated, as the proximal end portion 44 of the coupler 42 is being secured to one of the first and second panels 14, 16, the distal end portion 46 of the coupler 42 moves. In certain embodiments, moving 1010 the distal end portion 46 of the coupler 42 with respect to one of the first and second panels 14, 16 can include moving the distal end portion 46 away from the first panel 14 as the proximal end portion 44 is secured to the first panel 14 such that the first edge 28 of the first panel 14 moves toward the second edge 30. More specifically, as the proximal end portion 44 is secured to the first panel 14, the distal end portion 46 moves away from the first panel 14 such that the first edge 28 at the distal end 34 of the first panel 14 moves toward the second edge 30 at the distal end 38 of the second panel 16. In other embodiments, moving 1010 the distal end portion 46 of the coupler 42 with respect to one of the first and second panels 14, 16 can include moving the distal end portion 46 away from the second panel 16 as the proximal end portion 44 is secured to the second panel 16 such that the second edge 30 of the second panel 16 moves toward the first edge 28. More specifically, as the proximal end portion 44 is secured to the second panel 16, the distal end portion 46 moves away from the second panel 16 such that the second edge 28 at the distal end 38 of the second panel 16 moves toward the first edge 28 at the distal end 34 of the first panel 14.

The method 1000 can further include inserting 1012 the coupler 42 into the channel 90 of the bracket 40 such that the distal end portion 46 of the coupler 42 is hidden adjacent to the distal ends 34, 38 of the first and second panels 14, 16 and the proximal end portion 44 is exposed adjacent to the proximal ends 32, 36 of the first and second panels 14, 16. In other words, the distal end portion 46 of the coupler 42 is disposed at the outboard region 26 of the engine compartment 18 and is covered by the first and second panels 14, 16, while the proximal end portion 44 is disposed at the inboard region 24 of the engine compartment 18 which is exposed to allow easy accessibility by the worker to secure the coupler 42 to one of the first and second panels 14, 16. Generally, inserting 1012 the coupler 42 into the channel 90 occurs before securing 1008 the proximal end portion 44 of the coupler 42 to one of the first and second panels 14, 16. Furthermore, inserting 1012 the coupler 42 into the channel 90 occurs before moving 1010 the distal end portion 46 of the coupler 42 with respect to one of the first and second panels 14, 16 as the proximal end portion 44 is secured to the other one of the first and second panels 14, 16.

In certain embodiments, securing the proximal end portion 44 of the coupler 42 to the first panel 14 can include inserting the fastener 98 through the exposed proximal end portion 44 of the coupler 42, the bracket 40 and the first and second panels 14, 16 such that the second engagement surface 68 moves relative to the first engagement surface 60 as the coupler 42 is being secured to the first panel 14 to reduce the angle 70 until the second engagement surface 68 is offset from the first engagement surface 60 which moves the distal end portion 46 of the coupler 42 away from the first panel 14 to move the first edge 28 toward the second edge 30. Specifically, as the fastener 98 secures the proximal end portion 44 of the coupler 42 to the bracket 40, the proximal end portion 44 moves in the first direction 48 which begins to remove the angle 70 between the first and second engagement surface 60, 68 which causes the distal end portion 46 of the coupler 42 to move in the opposite direction 52 to engage and apply the pressure or force to the third engagement surface 100. The pressure or force causes the distal end 34 of the first panel 14 along the first edge 28 to move toward the distal end 38 of the second panel 16 along the second edge 30. Specifically, the fastener 98 is disposed through the first and second flanges 58, 74, the proximal end portion 44 of the coupler 42, the first side wall 86 of the bracket 40 such that the first and second flanges 58, 74 are sandwiched between the proximal end portion 44 and the first side wall 86.

It is to be appreciated that the order or sequence of performing the method 1000 as identified in the flowchart of FIG. 9 is for illustrative purposes and other orders or sequences are within the scope of the present disclosure. It is to also be appreciated that the method 1000 can include other features not specifically identified in the flowchart of FIG. 9.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An assembly for a vehicle, the assembly comprising:
a first panel including a first edge;
a second panel including a second edge generally aligning with the first edge of the first panel;
a bracket attached to one of the first and second panels; and
a coupler engaging the bracket and including a proximal end portion and a distal end portion, with the distal end portion being movable with respect to one of the first and second panels as the proximal end portion is secured to the other one of the first and second panels such that one of the first and second edges moves toward the other one of the first and second edges.

2. An assembly as set forth in claim 1 wherein the proximal end portion of the coupler is secured to the first panel such that the distal end portion is movable away from the first panel to move the first edge toward the second edge.

3. An assembly as set forth in claim 2 wherein the first panel includes a top surface facing away from the bracket, with the first edge being disposed adjacent to the top surface of the first panel, and wherein the first panel includes a first flange extending from the first edge away from the top surface of the first panel, with the first flange including a first engagement surface.

4. An assembly as set forth in claim 3 wherein the proximal end portion of the coupler includes a second engagement surface facing the first engagement surface, with the first and second engagement surfaces complementary in configuration to each other.

5. An assembly as set forth in claim 4 wherein:
the second engagement surface is disposed at an angle relative to the first engagement surface prior to the coupler being secured to the first panel;
the second engagement surface moves relative to the first engagement surface as the coupler is being secured to the first panel to reduce the angle until the second engagement surface is offset from the first engagement surface; and
the distal end portion correspondingly moves as the second engagement surface moves to reduce the angle between the first and second engagement surfaces.

6. An assembly as set forth in claim 4 wherein the first engagement surface presents a first perimeter end and a second perimeter end spaced from each other relative to a first axis, with the first engagement surface being contoured from the first perimeter end toward the second perimeter end.

7. An assembly as set forth in claim 4 wherein:
the second panel includes a top surface facing away from the bracket, with the second edge disposed adjacent to the top surface of the second panel;
the second panel includes a proximal end and a distal end along the second edge; and
the second panel includes a second flange extending outwardly away from the top surface of the second panel toward the proximal end of the second panel, with the second flange sandwiched between the first and second engagement surfaces.

8. An assembly as set forth in claim 7:
wherein the bracket includes a base extending along a longitudinal axis between a first end and a second end;
wherein the bracket includes a first side wall and a second side wall each extending from the base in a spaced relationship transverse to the longitudinal axis to define a channel therebetween, with the coupler being disposed in the channel; and
further including a fastener disposed through the second flange of the second panel, the first and second engagement surfaces and the first side wall of the bracket to secure the coupler to the first panel, with the first and second flanges being sandwiched between the proximal end portion of the coupler and the first side wall of the bracket.

9. An assembly as set forth in claim 2 wherein the bracket includes a base extending along a longitudinal axis between a first end and a second end, and wherein the bracket includes a first side wall and a second side wall each extending from the base in a spaced relationship transverse to the longitudinal axis to define a channel therebetween, with the coupler being disposed in the channel.

10. An assembly as set forth in claim 9 wherein the second side wall includes a third engagement surface disposed adjacent to the second end of the base, with the distal end portion of the coupler being movable to engage the third engagement surface to move the first edge toward the second edge as the proximal end portion of the coupler is secured to the first panel.

11. An assembly as set forth in claim 10 wherein the distal end portion of the coupler includes a foot facing the third engagement surface, with the foot engaging the third engagement surface as the proximal end portion of the coupler is secured to the first panel to move the first edge toward the second edge.

12. An assembly as set forth in claim 9 wherein the base defines an aperture adjacent to the first end to present a lip, and wherein the coupler includes a tab disposed in the aperture and engaging the lip to couple the coupler to the bracket.

13. An assembly as set forth in claim 1 wherein:
the first panel includes a proximal end and a distal end along the first edge;
the second panel includes a proximal end and a distal end along the second edge, with the proximal ends of the first and second panels being disposed adjacent to each other and the distal ends of the first and second panels being disposed adjacent to each other; and
the proximal end portion of the coupler is exposed adjacent to the proximal ends of the first and second panels, and the distal end portion of the coupler is hidden adjacent to the distal ends of the first and second panels.

14. An assembly as set forth in claim 1 further including a fastener disposed through the proximal end portion of the coupler, the first panel and the bracket to secure the coupler to the first panel.

15. An assembly as set forth in claim 1 wherein the coupler includes a middle portion disposed between the proximal end portion and the distal end portion, with the middle portion angling away from the first panel from the proximal end portion to distal end portion.

16. A method of assembling a vehicle, the method comprising:
attaching a bracket to one of a first panel and a second panel to define a unit;
coupling the unit to the other one of the first and second panels;
engaging a coupler with the bracket;
securing a proximal end portion of the coupler to one of the first and second panels; and
moving a distal end portion of the coupler with respect to one of the first and second panels as the proximal end portion is secured to the other one of the first and second panels such that one of a first edge of the first panel and a second edge of the second panel move toward the other one of the first and second edges.

17. A method as set forth in claim 16 wherein:
attaching the bracket to one of the first and second panels includes attaching the bracket to the first panel to define the unit;
coupling the unit to the other one of the first and second panels includes coupling the unit to the second panel;
securing the proximal end portion of the coupler to one of the first and second panels includes securing the proximal end portion of the coupler to the first panel; and
moving the distal end portion of the coupler with respect to one of the first and second panels includes moving the distal end portion away from the first panel as the proximal end portion is secured to the first panel such that the first edge of the first panel moves toward the second edge.

18. A method as set forth in claim 17 wherein:
engaging the coupler with the bracket occurs after coupling the unit to the second panel; and
engaging the coupler with the bracket includes positioning a second engagement surface of the coupler at an angle relative to a first engagement surface of the first panel before securing the proximal end portion of the coupler to the first panel.

19. A method as set forth in claim 18:
wherein the first panel includes a proximal end and a distal end along the first edge and the second panel includes a proximal end and a distal end along the second edge, with the proximal ends of the first and second panels disposed adjacent to each other and the distal ends of the first and second panels disposed adjacent to each other; and
further including inserting the coupler into a channel of the bracket such that the distal end portion of the coupler is hidden adjacent to the distal ends of the first and second panels and the proximal end portion is exposed adjacent to the proximal ends of the first and second panels.

20. A method as set forth in claim 19 wherein securing the proximal end portion of the coupler to the first panel includes inserting a fastener through the exposed proximal end portion of the coupler, the bracket and the first and second panels such that the second engagement surface moves relative to the first engagement surface as the coupler is being secured to the first panel to reduce the angle until the second engagement surface is offset from the first engagement surface which moves the distal end portion of the coupler away from the first panel to move the first edge toward the second edge.

\* \* \* \* \*